US010165233B2

(12) United States Patent
Ren et al.

(10) Patent No.: US 10,165,233 B2
(45) Date of Patent: Dec. 25, 2018

(54) INFORMATION PROCESSING METHOD, ELECTRONIC DEVICE AND COMPUTER STORAGE MEDIUM

(71) Applicant: NINEBOT (BEIJING) TECH CO., LTD., Beijing (CN)

(72) Inventors: Guanjiao Ren, Beijing (CN); Shiqian Dong, Beijing (CN); Ye Wang, Beijing (CN); Li Pu, Beijing (CN)

(73) Assignee: NINEBOT (BEIJING) TECH CO., LTD., Beijing (CN)

( * ) Notice: Subject to any disclaimer, the term of this patent is extended or adjusted under 35 U.S.C. 154(b) by 68 days.

(21) Appl. No.: 15/505,241

(22) PCT Filed: Sep. 30, 2016

(86) PCT No.: PCT/CN2016/101222
§ 371 (c)(1),
(2) Date: Feb. 20, 2017

(87) PCT Pub. No.: WO2017/166766
PCT Pub. Date: Oct. 5, 2017

(65) Prior Publication Data
US 2018/0160081 A1    Jun. 7, 2018

(30) Foreign Application Priority Data
Mar. 31, 2016   (CN) .......................... 2016 1 0200835

(51) Int. Cl.
*H04N 7/18*    (2006.01)
*G01S 3/32*    (2006.01)
*H04N 5/232*   (2006.01)

(52) U.S. Cl.
CPC ............. *H04N 7/185* (2013.01); *G01S 3/325* (2013.01); *H04N 5/232* (2013.01); *G06T 2207/10016* (2013.01)

(58) Field of Classification Search
CPC ......... H04N 7/185; H04N 5/232; G01S 3/325
See application file for complete search history.

(56) References Cited

U.S. PATENT DOCUMENTS

| 2010/0321495 | A1* | 12/2010 | Oya ...................... G01S 3/7864 348/143 |
| 2012/0002056 | A1  | 1/2012  | Nam |
| 2012/0195574 | A1* | 8/2012  | Wallace ................. H04N 5/772 386/278 |

FOREIGN PATENT DOCUMENTS

| CN | 104349037 A |   | 2/2015 |
| CN | 104853104 A | * | 8/2015 |

(Continued)

OTHER PUBLICATIONS

Machine English Translation of CN 104853104 A, Aug. 19, 2015 (Year: 2015).*

(Continued)

*Primary Examiner* — Nelson D. Hernández Hernández
(74) *Attorney, Agent, or Firm* — Cooper Legal Group, LLC

(57) ABSTRACT

The present invention discloses an information processing method, an electronic device and a computer storage medium. The method is applied to a mobile electronic device, the electronic device is provided with an image collection unit, the image collection unit can carry out image collection, and the method includes: acquiring a first instruction, wherein the first instruction is used for indicating to carry out image collection based on target tracking; responding to the first instruction, and acquiring position information between a target object and the electronic device; acquiring a first parameter according to the position information, and controlling a movement state of the electronic device according to the first parameter, so that the electronic device tracks the target object, wherein the first parameter is (Continued)

a parameter used for controlling the movement state of the electronic device; and acquiring a second parameter according to the position information, and controlling an image collection posture of the image collection unit according to the second parameter, so that the image collection unit can acquire an image satisfying a first condition in a process when the electronic device tracks the target object.

17 Claims, 2 Drawing Sheets

(56) References Cited

FOREIGN PATENT DOCUMENTS

| | | |
|---|---|---|
| CN | 104853104 A | 8/2015 |
| CN | 104967827 A | 10/2015 |
| CN | 105184776 A | 12/2015 |
| CN | 105357484 A | 2/2016 |
| CN | 105872371 A | 8/2016 |
| EP | 2402905 A1 | 1/2012 |
| JP | H0696211 A | 4/1994 |

OTHER PUBLICATIONS

English Translation of International Search Report in international application No. PCT/CN2016/101222, dated Dec. 19, 2016, 2 pgs.

\* cited by examiner

INFORMATION PROCESSING METHOD, ELECTRONIC DEVICE AND COMPUTER STORAGE MEDIUM

RELATED APPLICATIONS

This application is a United States National Stage Application filed under 35 U.S.C 371 of PCT Patent Application Serial No. PCT/CN2016/101222, filed Sep. 30, 2016, which claims Chinese Patent Application Serial No. CN 201610200835.0, filed Mar. 31, 2016, the disclosure of all of which are hereby incorporated by reference in their entirety.

FIELD OF THE INVENTION

The present invention relates to the field of intelligent image/video shooting technology, in particular to an information processing method, an electronic device and a computer storage medium.

BACKGROUND OF THE INVENTION

In the prior art, common image/video shooting means include: 1, a staff holds a camera on the hand or the shoulder for shooting; 2, the camera is installed on a lifting arm, and the staff controls the movement of the lifting arm to shoot a target; and 3, the camera is installed on a guide rail, and the staff controls the movement of the camera on the guide rail to shoot the target. These shooting means have certain limitations, and these limitations at least include limitations of shooting environments, limitations of shooting ranges, and so on. Therefore, the technical solutions of the present invention are proposed to realize image/video shooting with higher degrees of freedom and flexibility.

SUMMARY OF THE INVENTION

To solve the technical problems in the prior art, embodiments of the present invention provide an information processing method, an electronic device and a computer storage medium.

The embodiments of the present invention are achieved as tracks:

In one embodiment of the present invention, an information processing method is provided. The information processing method is applied to a mobile electronic device, the electronic device is provided with an image collection unit, the image collection unit can carry out image collection, and the method includes:

acquiring a first instruction, wherein the first instruction is used for indicating to carry out image collection based on target tracking;

responding to the first instruction, and acquiring position information between a target object and the electronic device;

acquiring a first parameter according to the position information, and controlling a movement state of the electronic device according to the first parameter, so that the electronic device tracks the target object, wherein the first parameter is a parameter used for controlling the movement state of the electronic device; and acquiring a second parameter according to the position information, and controlling an image collection posture of the image collection unit according to the second parameter, so that the image collection unit can acquire an image satisfying a first condition in a process when the electronic device tracks the target object.

In an implementation, preset first restriction data is stored in the electronic device, the first restriction data is used for describing a restricted movement track or a restricted movement area of the electronic device, and based on the control of the first restriction data, the electronic device cannot move to the outside of the restricted movement track or the restricted movement area; and the method further includes:

after acquiring the first parameter according to the position information, correcting the first parameter according to the first restriction data, and controlling the movement state of the electronic device according to the corrected first parameter, so that the electronic device only tracks the target object on the movement track or in the movement area.

In an implementation, preset second restriction data is stored in the electronic device, the second restriction data is used for describing the restricted movement track of the electronic device and a movement strategy of the electronic device on the restricted movement track, and the method further includes:

acquiring a second instruction, wherein the second instruction is used for indicating the electronic device to move along the restricted movement track in accordance with the movement strategy and carry out image collection on the target object in a movement process; and responding to the second instruction, controlling the electronic device to move on the restricted movement track in accordance with the movement strategy according to the second restriction data, and in the movement process of the electronic device, acquiring the position information between the target object and the electronic device, acquiring the second parameter according to the position information, and controlling the image collection posture of the image collection unit according to the second parameter, so that the image collection unit can acquire the image satisfying the first condition in the movement process of the electronic device.

In an implementation, the method further includes: recording the restricted movement track of the electronic device in the tracking manner:

acquiring a third instruction, wherein the third instruction is used for indicating to start recording the movement track of the electronic device;

responding to the third instruction, and recording time-varying coded disc data and time-varying inertial measurement unit (IMU) data in the movement process of the electronic device, wherein the coded disc data and the IMU data are used for describing the restricted movement track;

acquiring a fourth instruction, wherein the fourth instruction is used for indicating to stop recording the movement track of the electronic device; and responding to the fourth instruction, and storing the recorded coded disc data and IMU data.

In an implementation, the method further includes: acquiring a third parameter of the electronic device, and further adjusting the image collection posture of the image collection unit according to the third parameter after acquiring the image satisfying the first condition, in order to acquire an image satisfying a second condition, wherein the third parameter is used for describing the own posture of the electronic device.

In an implementation, an ultra-wideband (UWB) tag is arranged on the target object, the electronic device includes a UWB unit, and the acquiring the position information between the target object and the electronic device includes:

carrying out, by the electronic device, UWB signal interaction with the UWB tag through the UWB unit, and acquiring the position information between the target object and the electronic device based on a signal sent by the UWB unit to the UWB tag and a received return signal of the UWB tag.

In another embodiment of the present invention, an electronic device is further provided, including: a moving unit, an image collection unit and a target tracking unit, wherein the image collection unit and the target locking unit are arranged on the moving unit, the moving unit can move while carrying the image collection unit and the target locking unit, the target locking unit is used for tracking a target object, and the image collection unit is used for collecting a image; the target locking unit is further used for acquiring a first instruction, wherein the first instruction is used for indicating to carry out image collection based on target tracking; and responding to the first instruction, acquiring position information between the target object and the electronic device, and sending the position information to the moving unit and the image collection unit;

the moving unit is further used for receiving the position information sent by the target locking unit, acquiring a first parameter according to the position information, and controlling a movement state of the moving unit according to the first parameter, so that the moving unit tracks the target object, wherein the first parameter is a parameter used for controlling the movement state of the moving unit; and the image collection unit is further used for receiving the position information sent by the target locking unit, acquiring a second parameter according to the position information, and controlling an image collection posture of the image collection unit according to the second parameter, so that the image collection unit can acquire an image satisfying a first condition in a process when the moving unit tracks the target object.

In an implementation, the electronic device further includes: a first restriction data storage unit, used for storing preset first restriction data, wherein the first restriction data is used for describing a restricted movement track or a restricted movement area of the electronic device, and based on the control of the first restriction data, the electronic device cannot move to the outside of the restricted movement track or the restricted movement area;

the moving unit is further used for: after acquiring the first parameter according to the position information, correcting the first parameter according to the first restriction data, and controlling the movement state of the electronic device according to the corrected first parameter, so that the electronic device only tracks the target object on the movement track or in the movement area.

In an implementation, the electronic device further includes:

a second restriction data storage unit, used for storing preset second restriction data, wherein the second restriction data is used for describing the restricted movement track of the electronic device and a movement strategy of the electronic device on the restricted movement track;

the moving unit, the target locking unit and the image collection unit are further used for acquiring a second instruction, wherein the second instruction is used for indicating the electronic device to move along the restricted movement track in accordance with the movement strategy and carry out image collection on the target object in a movement process;

the moving unit is further used for responding to the second instruction, and controlling the electronic device to move on the restricted movement track in accordance with the movement strategy according to the second restriction data;

the target locking unit is further used for: in the movement process of the moving unit, acquiring the position information between the target object and the electronic device, and sending the position information to the image collection unit; and the image collection unit is further used for acquiring the second parameter according to the position information, and controlling the image collection posture of the image collection unit according to the second parameter, so that the image collection unit can acquire the image satisfying the first condition in the movement process of the moving unit.

In an implementation, the electronic device further includes a restricted movement track recording unit, used for recording the restricted movement track of the electronic device in the tracking manner:

acquiring a third instruction, wherein the third instruction is used for indicating to start recording the movement track of the electronic device; responding to the third instruction, and recording time-varying coded disc data and time-varying inertial measurement unit (IMU) data in the movement process of the electronic device, wherein the coded disc data and the IMU data are used for describing the restricted movement track; acquiring a fourth instruction, wherein the fourth instruction is used for indicating to stop recording the movement track of the electronic device; and responding to the fourth instruction, and stopping recording the coded disc data and the IMU data;

wherein the recorded coded disc data and IMU data are stored in the first restriction data storage unit or the second restriction data storage unit.

In an implementation, the image collection unit is further used for acquiring a third parameter of the electronic device, and further adjusting the image collection posture of the image collection unit according to the third parameter after acquiring the image satisfying the first condition, in order to acquire an image satisfying a second condition, wherein the third parameter is used for describing the own posture of the electronic device.

In a specific implementation, the target locking unit is an ultra wideband (UWB) unit, the UWB unit is used for carrying out UWB signal interaction with a UWB tag arranged on the target object, and acquiring the position information between the target object and the electronic device based on a signal sent by the UWB unit to the UWB tag and a received return signal of the UWB anchor.

In yet another embodiment of the present invention, a computer storage medium is further provided, wherein a computer executable instruction is stored in the computer storage medium, and the computer executable instruction is configured to execute the information processing method in the embodiment of the present invention.

By adopting the information processing method, the electronic device and the computer storage medium provided by the embodiments of the present invention, the electronic device can track the target object and can adaptively adjust the image collection posture of the image collection unit in a tracking process, so that the target object is always in the composition of the image collection unit. The embodiments of the present invention are not limited by shooting environments or shooting ranges, and can achieve image/video shooting with higher degrees of freedom and flexibility.

BRIEF DESCRIPTION OF THE DRAWINGS

By reading the detailed description in the preferred implementations below, various other advantages and benefits will become clear to those of ordinary skill in the art. The accompanying drawings in the embodiments are merely used for the purpose of showing the preferred implementations, but cannot be deemed as limitations to the present invention. In the accompanying drawings.

DETAILED DESCRIPTION OF THE EMBODIMENTS

Exemplary embodiments of the present disclosure will be described below in more detail with reference to the accompanying drawings. Although the exemplary embodiments of the present disclosure are displayed in the accompanying drawings, it should be understood that the present disclosure can be implemented in a variety of forms and should not be limited by the embodiments set forth herein. On the contrary, these embodiments are provided so as to provide a more thorough understanding of the present disclosure, and the scope of the present disclosure can be completely conveyed to those skilled in the art.

Technical solutions of the present invention will be further illustrated below in detail in combination with the accompanying drawings and specific embodiments.

First Embodiment

Figure 1:
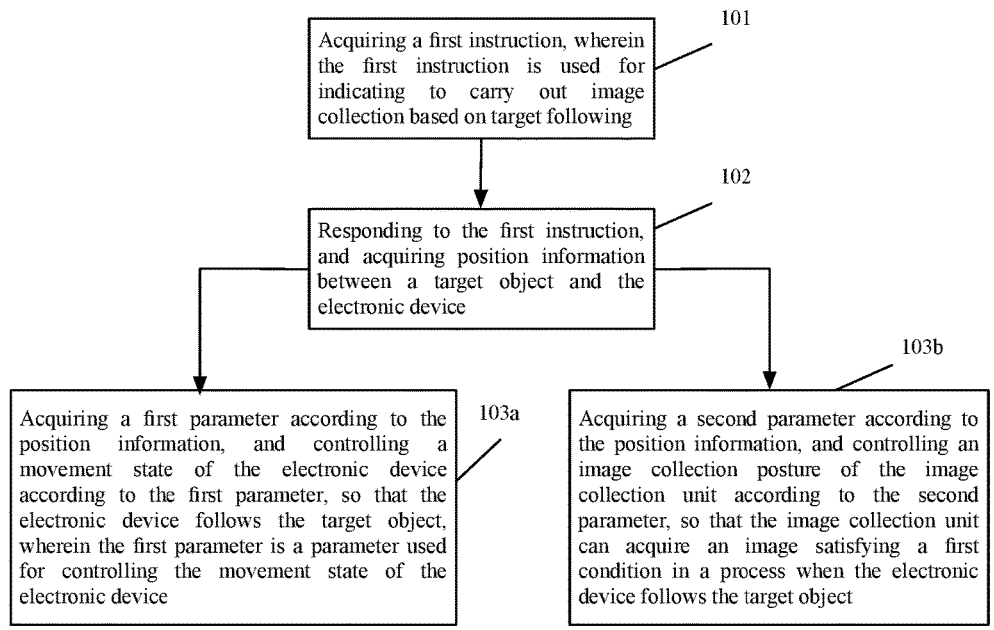
FIG. 1 is a flowchart of an information processing method in a first embodiment of the present invention.

The first embodiment of the present invention provides an information processing method, applied to a mobile electronic device. The electronic device is provided with an image collection unit, and the image collection unit can carry out image collection; as shown in FIG. 1, the method includes:

step 101, a first instruction is acquired, wherein the first instruction is used for indicating to carry out image collection based on target tracking. The electronic device can acquire the first instruction when a user triggers a operation for tracking target and collecting images, for example, when the user triggers a specific button on the electronic device, the electronic device acquires the first instruction; or when the user triggers a specific button on a control interface (it can be the own control interface of the electronic device and can also be the control interface of a control device that keeps communication with the electronic device), the electronic device acquires the first instruction, and so on.

It should be noted that, the electronic device in the embodiment of the present invention refers to an electronic device that can achieve automatic movement, the so-called automatic movement refers to movement that can be automatic achieved according to automatic acquired information without external control, for example: automatic movement control (e.g., obstacle avoidance, path planning) based on the detection of an external environment, or autonomous movement control based on target tracking, and so on. The electronic device in the embodiment of the present invention is required to at least have the two functions of target tracking and image collection, the so-called target tracking refers to that the electronic device can track a target object to move, for example, tracking by keeping a certain distance and angle with the target object; and the so-called image collection refers to that the electronic device can carry out image collection on the target object, such as shooting, picture recording.

Step 102, the first instruction is responded to, and position information between the target object and the electronic device is acquired.

After acquiring the first instruction, the electronic device responds to the first instruction and acquires the position information between the target object and the electronic device through a position information measurement tool of the electronic device. It should be noted that, there can be a variety of position information measurement tools, including measurement tools (e.g., a GPS positioning tool) that can measure absolute position information of the target object and the electronic device, as well as measurement tools (e.g., based on ultra wideband, ultrasonic, infrared distance measurement, sonar, radar, binocular vision and the like) that can measure a relative position relationship (e.g., a relative distance and an included angle) between the target object and the electronic device.

Step 103a, a first parameter is acquired according to the position information, and a movement state of the electronic device is controlled according to the first parameter, so that the electronic device tracks the target object, wherein the first parameter is a parameter used for controlling the movement state of the electronic device.

After acquiring the position information between the target object and the electronic device, the electronic device can acquire the relative position relationship between itself and the target object, the first parameter used for controlling the movement state of the electronic device is acquired accordingly, and the first parameter is executed to control the movement of the electronic device, so that the electronic device can track the target object in real time.

For example, after acquiring the absolute position information of the target object and the electronic device through the GPS positioning tool, the electronic device calculates the absolute position information where the electronic device needs to leave for according to a preset tracking condition (e.g., a tracking distance, a tracking angle and the like), and calculates the first parameter according to the absolute position information needing to leave for and the current absolute position information of the electronic device, the first parameter is used for describing a translation speed and a rotating speed of the electronic device, and the electronic device travels according to the translation speed and the turning speed to arrive at the absolute position needing to leave for; and in the travelling process, the electronic device will still continuously acquire the absolute position information of the target object and the electronic device and continuously calculate a new first parameter, so as to continuously control the translation speed and the turning speed of the electronic device, and thus the electronic device can continuously track the target object.

As another example, the electronic device acquires a relative distance and an included angle between the target object and the electronic device through a relative position measurement tool (e.g., based on ultra wideband, ultrasonic, infrared distance measurement, sonar, radar, binocular vision and the like), calculates a distance adjustment amount and an angle adjustment amount of the electronic device according to the preset tracking condition (e.g., the tracking distance, the tracking angle and the like), and calculates the first parameter according to the distance adjustment amount and the angle adjustment amount, the first parameter is used for describing the translation speed and the turning speed of the electronic device, and the electronic device travels according to the translation speed and the turning speed; and in the travelling process, the electronic device will still continuously acquire the absolute position information of the target object and the electronic device and continuously calculate the new first parameter, so as to continuously control the translation speed and the turning speed of the electronic device, and thus the electronic device can continuously track the target object.

Step 103b, a second parameter is acquired according to the position information, and an image collection posture of the image collection unit is controlled according to the second parameter, so that the image collection unit can acquire an image satisfying a first condition in a process when the electronic device tracks the target object.

After acquiring the position information between the target object and the electronic device, the electronic device can acquire the relative position relationship between itself and the target object, and thus the electronic device can acquire the second parameter used for controlling the image collection posture of the image collection unit according to this relative position relationship; and the image collection posture of the image collection unit is adjusted according to the second parameter, so that the image collection unit can acquire the image satisfying the first condition in the process when the electronic device tracks the target object.

The first condition can be used for restricting the position/area or the like of the target object in the image collected by the image collection unit, for example, the first condition is used for restricting that the target object only needs to be located in the composition of the image collection unit, or the first condition is used for restricting that the target object is located in a central rectangular/circular area of the composition of the image collection unit, and so on.

The image collection posture can include: a pitch, a yaw and a roll of the image collection unit, the pitch refers to a rotating angle of the image collection unit around an X axis, the yaw refers to a rotating angle of the image collection unit around a Y axis, and the roll refers to a rotating angle of the image collection unit around a Z axis. The second parameter can include a pitch adjustment amount, a yaw adjustment amount and a roll adjustment amount, and is used for describing the adjustment amounts of the image collection unit on the pitch, the yaw and the roll. For example, by means of the adjustment on the pitch, the yaw and the roll, the target object is located in the composition of the image collection unit; or by means of the adjustment on the pitch, the yaw and the roll, the target object is located in the central rectangular/circular area of the composition of the image collection unit.

It should be noted that, in the embodiment of the present invention, the electronic device continuously acquires the position information between the target object and the electronic device according to certain frequency, so as to continuously update the corresponding first parameter and second parameter to continuously update the movement state of the electronic device according to the updated first parameter, so that the electronic device continuously tracks the target object, and the image collection posture of the image collection unit is continuously updated according to the updated second parameter, so that the image collection unit can always acquire the image satisfying the first condition in the process of tracking the target object.

In an implementation, preset first restriction data is stored in the electronic device, the first restriction data is used for describing a restricted movement track or a restricted movement area of the electronic device, and based on the control of the first restriction data, the electronic device cannot move to the outside of the restricted movement track or the restricted movement area, but the electronic device automatic moves on the restricted movement track or in the restricted movement area; the method in the embodiment of the present invention further includes:

after acquiring the first parameter according to the position information, correcting the first parameter according to the first restriction data, and controlling the movement state of the electronic device according to the corrected first parameter, so that the electronic device only tracks the target object on the movement track or in the movement area.

That is to say, in the implementation, the movement track or the movement area of the electronic device is limited by the preset first restriction data, so that the movement device only moves on the preset movement track or in the preset movement area; and then, by adopting the implementation, the electronic device can only track the target object under restricted conditions (i.e., the restriction of the movement track or the movement area). Due to the restriction of the first restriction data, after acquiring the first parameter according to the position information of itself and the target object, the electronic device needs to correct the first parameter by using the first restriction data, to prevent the uncorrected first parameter from controlling the electronic device to move beyond the movement track or the movement area; and specifically, the electronic device can predict the movement track of the electronic device according to the first parameter, compare the predicted movement track with the restricted movement track or the restricted movement area to judge whether the predicted movement track exceeds the restricted movement track or the restricted movement area, and if so, correct the first parameter according to the first restriction data, so the predicted movement track is prevented from exceeding the restricted movement track or the restricted movement area by the corrected first parameter, and if not, the first parameter does not need to be corrected.

In another implementation, preset second restriction data is stored in the electronic device, the second restriction data is used for describing the restricted movement track of the electronic device and a movement strategy of the electronic device on the restricted movement track, the movement strategy is used for describing a movement rule (route, time, speed and the like) of the electronic device on the restricted movement track, and the method in the embodiment of the present invention further includes:

acquiring a second instruction, wherein the second instruction is used for indicating the electronic device to move along the restricted movement track in accordance with the movement strategy and carry out image collection on the target object in a movement process; for example, the movement strategy specifies that the electronic device moves from a point A to a point B on the restricted movement track, or the restricted movement track is a closed loop track, and the movement strategy specifies that the electronic device circularly moves along the closed loop track (i.e., circling), and the like; and responding to the second instruction, controlling the electronic device to move on the restricted movement track in accordance with the movement strategy according to the second restriction data, and in the movement process of the electronic device, acquiring the position information between the target object and the electronic device, acquiring the second parameter according to the position information, and controlling the image collection posture of the image collection unit according to the second parameter, so that the image collection unit can acquire the image satisfying the first condition in the movement process of the electronic device.

For example, the electronic device is controlled to move from the point A to the point B on the restricted movement track according to the second restriction data, and the electronic device acquires the position information between the target object and the electronic device in the movement process, then acquires the second parameter used for controlling the image collection posture of the image collection unit accordingly and controls the posture of the image collection unit through the second parameter, so that the image collection unit can acquire the image satisfying the first condition (for example, the lens of the image collection unit is always aligned with the target object).

As another example, the electronic device is controlled to circularly move (i.e., circling) on the closed loop track according to the second restriction data, and the electronic device acquires the position information between the target object and the electronic device in the movement process, then acquires the second parameter used for controlling the image collection posture of the image collection unit accordingly and controls the posture of the image collection unit through the second parameter, so that the image collection unit can acquire the image satisfying the first condition (for example, the lens of the image collection unit is always aligned with the target object).

In the implementation, it is not required that the movement of the electronic device tracks the target object, because the second restriction data requires that the electronic device moves along a certain restricted movement track according to a certain movement strategy; but it is required that the image collection unit of the electronic device can track the target object, and the image collection posture of the image collection unit is adjusted according to the position change of the electronic device and the target object at any time, so that the lens of the image collection unit is aligned with the target object.

In the embodiment of the present invention, the restricted movement track of the electronic device can be recorded in the tracking manner:

acquiring a third instruction, wherein the third instruction is used for indicating to start recording the movement track of the electronic device;

responding to the third instruction, and recording time-varying coded disc data (it can be used for describing a wheel rotating speed of the electronic device) and time-varying inertial measurement unit (IMU) data (it can be used for describing a three-axis angular speed and an acceleration of the electronic device) in the movement process of the electronic device, wherein the coded disc data and the IMU data are used for describing the restricted movement track;

acquiring a fourth instruction, wherein the fourth instruction is used for indicating to stop recording the movement track of the electronic device; and responding to the fourth instruction, and storing the recorded time-varying coded disc data and IMU data.

A teaching/playback movement track recording method is described above, for example, the user pushes the electronic device to move from the point A to the point B, and the electronic device records the time-varying coded disc data and the time-varying IMU data in the movement process; and then, the electronic device is placed to the point A again, and the electronic device implements the time-varying coded disc data and the time-varying IMU data to autonomously move from the point A to the point B.

Of course, the embodiment of the present invention is not limited to this teaching/playback movement track recording method, and the time-varying coded disc data and the time-varying IMU data can also be directly pre-stored in the electronic device in an encoding mode.

In another implementation, the method in the embodiment of the present invention further includes: acquiring a third parameter of the electronic device, and further adjusting the image collection posture of the image collection unit according to the third parameter after acquiring the image satisfying the first condition, in order to acquire an image satisfying a second condition, wherein the third parameter is used for describing the own posture of the electronic device.

In order to reduce the influence of the posture fluctuation of the electronic device on the working stability of the image collection unit (e.g., keeping the stability of the lens) in the movement process, in the implementation, the posture information, namely the third parameter (e.g., pitch, yaw, roll or the like) of the electronic device is acquired according to certain frequency, and the image collection posture of the image collection unit is further adjusted (may be fine tuned) accordingly to improve the visual effect of the image.

For example, the first condition restricts that the target object is located in the central area of the composition of the image collection unit, when the image collection unit is controlled by the second parameter to only satisfy the first condition (the target object is located in the central area of the composition), the acquired image effect cannot be ensured, this is because the electronic device experiences jitter and jolt in general, which is liable to cause the jitter of the target object in the central area of the composition, and the image effect acquired in this case is poor; and since the third parameter of the electronic device is measured, the posture of the image collection unit is adjusted in a mode with higher sensitivity, so that the shooting posture of the image collection unit is always kept at an optimal posture (optimal pitch, yaw, roll) without being influenced by the jitter or jolt of the electronic device, and thus the visual effect of the acquired image is improved.

In another implementation, an ultra wideband (UWB) tag is arranged on the target object, the electronic device includes a UWB unit, and the acquiring the position information between the target object and the electronic device includes:

carrying out, by the electronic device, UWB signal interaction with the UWB tag through the UWB unit, and acquiring the position information between the target object and the electronic device based on a signal sent by the UWB unit to the UWB tag and a received return signal of the UWB tag.

That is to say, based on the UWB technology, the electronic device can track the position of the target object, the UWB tag is installed on the target object, the UWB unit is installed on the electronic device, the signal is transmitted to the UWB tag by the UWB unit, the return signal of the UWB tag is received, a relative distance d and a relative angle θ between the UWB tag and the UWB unit can be acquired, and the relative position relationship between the UWB tag and the UWB unit is described accordingly; and according to the relative position relationship between the UWB tag and the UWB unit, and considering a preset position conversion relationship among the UWB tag, the target object, the UWB unit and the electronic device, the relative position relationship between the electronic device and the target object can be acquired and is used for describing the relative position between the electronic device and the target object. The relative distance d between the UWB tag and the UWB unit can be measured by technology based on TOF (Time of Flight), and the relative distance d is converted by calculating a time difference between transmission and reflection of radio waves (or optical, acoustic waves or the like) by the TOF. The relative angle θ between the UWB tag and the UWB unit can be measured by technology based on AOA (Angle of arrival), the AOA is used for sensing the arrival direction of a transmitting node signal through some hardware devices based on a positioning algorithm of the angle of arrival of the signal to calculate the relative direction or the relative angle between a receiving node and an anchor node.

It should be noted that, the embodiment of the present invention is not limited to adopting the UWB technology to acquire the position information between the target object and the electronic device, in order to enable the electronic device to track the target object; and the embodiment of the present invention can also adopt such technical means as ultrasonic, infrared distance measurement, sonar, radar, binocular vision, GPS and the like to acquire the position information between the target object and the electronic device, in order to enable the electronic device to track the target object, and this is not limited in the embodiment of the present invention.

By implementing the first embodiment of the present invention, the electronic device can track the target object and can adaptively adjust the image collection posture of the image collection unit in a tracking process, so that the target object is always in the composition of the image collection unit; and moreover, the influence of jitter and jolt of the electronic device on the image collection posture of the image collection unit in the movement process is detected, and the image collection posture is further fine tuned, so that the image collection unit can deal with the jitter and jolt of the electronic device in the movement process, so as to guarantee the visual effect of the acquired image. The target tracking shooting in the embodiment of the present invention is not limited by shooting environments or shooting ranges, and image/video shooting with higher degrees of freedom and flexibility can be achieved, so that the application scenarios are extensive.

Second Embodiment

Figure 2:
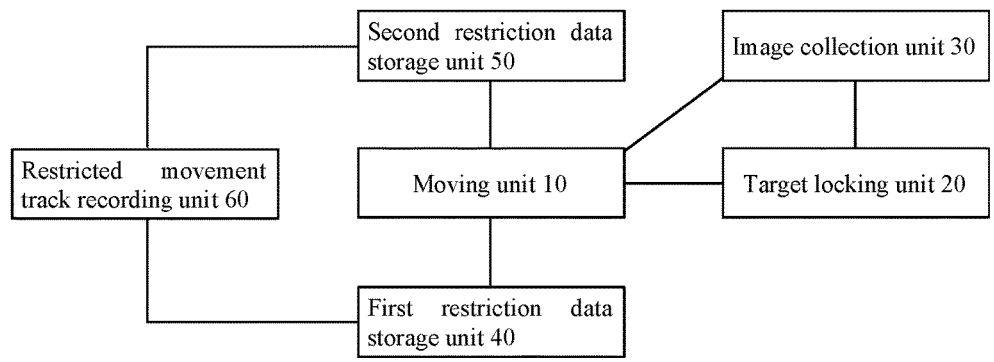
FIG. 2 is a schematic diagram of structural composition of an electronic device in a second embodiment of the present invention.

Corresponding to the information processing method in the first embodiment of the present invention, the second embodiment of the present invention further provides an electronic device. As shown in FIG. 2, the electronic device includes a moving unit 10, an image collection unit 30 and a target locking unit 20, wherein the image collection unit 30 and the target locking unit 20 are arranged on the moving unit 10, the moving unit 10 can move while carrying the image collection unit 30 and the target locking unit 20, the target locking unit 20 is used for locking a target object, and the image collection unit 30 is used for carrying out image collection;

the target locking unit 20 is further used for acquiring a first instruction, wherein the first instruction is used for indicating to carry out image collection based on target tracking; and responding to the first instruction, acquiring position information between the target object and the electronic device, and sending the position information to the moving unit 10 and the image collection unit 30;

the moving unit 10 is further used for receiving the position information sent by the target locking unit 20, acquiring a first parameter according to the position information, and controlling a movement state of the moving unit 10 according to the first parameter, so that the moving unit 10 tracks the target object, wherein the first parameter is a parameter used for controlling the movement state of the moving unit 10; and the image collection unit 30 is further used for receiving the position information sent by the target locking unit 20, acquiring a second parameter according to the position information, and controlling an image collection posture of the image collection unit 30 according to the second parameter, so that the image collection unit 30 can acquire an image satisfying a first condition in a process when the moving unit 10 tracks the target object.

In an implementation, the electronic device further includes: a first restriction data storage unit 40, connected with the moving unit 10, and used for storing preset first restriction data, wherein the first restriction data is used for describing a restricted movement track or a restricted movement area of the electronic device, and based on the control of the first restriction data, the electronic device cannot move to the outside of the restricted movement track or the restricted movement area;

the moving unit 10 is further used for: after acquiring the first parameter according to the position information, correcting the first parameter according to the first restriction data, and controlling the movement state of the moving unit 10 according to the corrected first parameter, so that the moving unit 10 only tracks the target object on the movement track or in the movement area.

In an implementation, the electronic device further includes:

a second restriction data storage unit 50, connected with the moving unit 10, and used for storing preset second restriction data, wherein the second restriction data is used for describing the restricted movement track of the electronic device and a movement strategy of the electronic device on the restricted movement track;

the moving unit 10, the target locking unit 20 and the image collection unit 30 are further used for acquiring a second instruction, wherein the second instruction is used for indicating the electronic device to move along the restricted movement track in accordance with the movement strategy and carry out image collection on the target object in a movement process;

the moving unit 10 is further used for responding to the second instruction, and controlling the moving unit 10 to move on the restricted movement track in accordance with the movement strategy according to the second restriction data;

the target locking unit 20 is further used for: in the movement process of the moving unit 10, acquiring the position information between the target object and the electronic device, and sending the position information to the image collection unit 30; and the image collection unit 30 is further used for acquiring the second parameter according to the position information, and controlling the image collection posture of the image collection unit 30 according to the second parameter, so that the image collection unit 30 can acquire the image satisfying the first condition in the movement process of the moving unit 10.

In an implementation, the electronic device further includes a restricted movement track recording unit 60, connected with the first restriction data storage unit 40 and the second restriction data storage unit 50, wherein the restricted movement track recording unit 60 is used for recording the restricted movement track of the electronic device in the tracking manner:

acquiring a third instruction, wherein the third instruction is used for indicating to start recording the movement track of the electronic device; responding to the third instruction, and recording time-varying coded disc data and time-varying IMU data in the movement process of the electronic device, wherein the coded disc data and the IMU data are used for describing the restricted movement track; acquiring a fourth instruction, wherein the fourth instruction is used for indicating to stop recording the movement track of the electronic device; and responding to the fourth instruction, and stopping recording the coded disc data and the IMU data;

wherein the recorded coded disc data and IMU data are stored in the first restriction data storage unit 40 or the second restriction data storage unit 50.

In an implementation, the image collection unit 30 is further used for acquiring a third parameter of the electronic device, and further adjusting the image collection posture of the image collection unit according to the third parameter after acquiring the image satisfying the first condition, in order to acquire an image satisfying a second condition, wherein the third parameter is used for describing the own posture of the moving unit 10.

In an implementation, the target locking unit 20 is a UWB unit, the UWB unit is used for carrying out UWB signal interaction with a UWB tag arranged on the target object, and acquiring the position information between the target object and the electronic device based on a signal sent by the UWB unit to the UWB tag and a received return signal of the UWB tag.

By implementing the second embodiment of the present invention, the electronic device can track the target object and can adaptively adjust the image collection posture of the image collection unit in a tracking process, so that the target object is always in the composition of the image collection unit; and moreover, the influence of jitter and jolt of the electronic device on the image collection posture of the image collection unit in the movement process is detected, and the image collection posture is further fine tuned, so that the image collection unit can deal with the jitter and jolt of the electronic device in the movement process, so as to guarantee the visual effect of the acquired image. The target tracking shooting in the embodiment of the present invention is not limited by shooting environments or shooting ranges, and image/video shooting with higher degrees of freedom and flexibility can be achieved, so that the application scenarios are extensive.

It should be particularly noted that, the electronic device in the embodiment of the present invention refers to an electronic device that can achieve autonomous movement, the so-called autonomous movement refers to movement that can be autonomously achieved according to autonomously acquired information without external control, for example: autonomous movement control (e.g., obstacle avoidance) based on the detection of an external environment, or autonomous movement control based on target tracking, and so on. Common electronic devices that can achieve the autonomous movement include self-balancing cars, unmanned aerial vehicles or the like. The electronic device in the embodiment of the present invention is required to at least have the two functions of target tracking and image collection, the so-called target tracking refers to that the electronic device can track a target object to move, for example, tracking by keeping a certain distance and angle with the target object; and the so-called image collection refers to that the electronic device can carry out image collection on the target object, such as shooting, picture recording.

The embodiment of the present invention will be further illustrated below with a situation as an example that the two functions of target tracking and image collection are carried on the self-balancing car.

Figure 3:
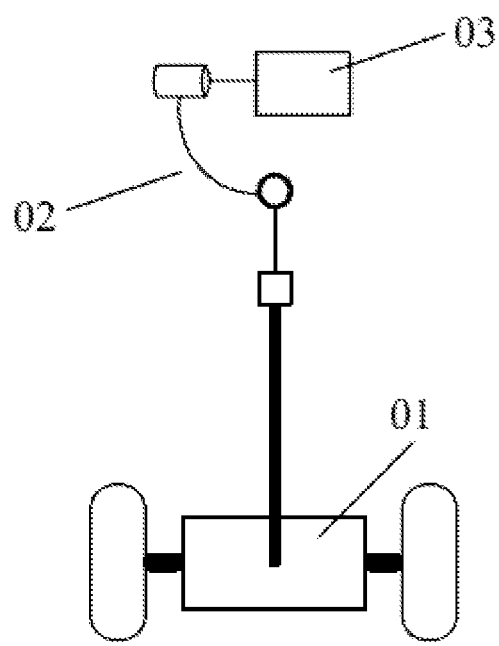
FIG. 3 is a schematic diagram of structural composition of a self-balancing vehicle for autonomously tracking a target for shooting in one embodiment of the present invention.

Referring to FIG. 3, FIG. 3 is a schematic diagram of structural composition of a self-balancing car in one embodiment of the present invention. In FIG. 3, 01 represents the self-balancing car, a tripod head 02 is installed on the self-balancing car 01, and a UWB unit (not shown in the figure) and an image collection unit 03 (camera) are arranged on the tripod head; and the self-balancing car 01 is the autonomous movement apparatus in the embodiment of the present invention, and the self-balancing car 01 can track a target object based on UWB technology (a preset tracking distance and/or a tracking angle or the like is satisfied). The tripod head 02 is a tripod head with three degrees of freedom, which can adjust the tracking three angles: pitch, yaw and roll, and based on the adjustment of the tripod head 02, the posture of the image collection unit 03 installed thereon can be adjusted. The target tracking shooting process of the self-balancing car 01 carrying the tripod head 02, the UWB unit and the image collection unit 03 is respectively illustrated below in combination with different scenarios.

First Scenario:

A movement track is preset for the self-balancing car 01, the self-balancing car 01 moves according to the preset track (for example, it is preset that the self-balancing car 01 walks from a point A to a point B according to the track within 1 minute), the UWB unit on the tripod head 02 measures position information between the target object (no matter the target object is static or moving) and the UWB unit in a movement process, and the tripod head 02 is adjusted to make the lens of the image collection unit 03 (camera) to be always aligned with the target object. The target tracking shooting process in the movement process of the self-balancing car 01 is as tracks:

firstly, based on the trigger of the user, the self-balancing car 01 acquires a second instruction, wherein the second instruction is used for indicating the self-balancing car 01 to move along a preset restricted movement track according to a preset movement strategy and carry out image collection on the target object in the movement process;

secondly, the self-balancing car 01 responds to the second instruction and moves along the preset movement track according to the preset movement strategy, and in the movement process of the self-balancing car 01, the UWB unit on the tripod head 02 communicates with a UWB tag installed on the target object to acquire the position information between the UWB tag and a UWB unit;

the tripod head 02 acquires a second parameter used for adjusting the posture (three postures of pitch, yaw and roll) of the tripod head 02 according to the position information, and the own posture of the tripod head 02 is adjusted according to the second parameter to make the lens of the image collection unit 03 be always aligned with the target object in the movement process of the self-balancing car 01, so that the target object is always located in the composition of the image collection unit 03 (for example, the target object is always located in the central area of the composition of the image collection unit 03); and in addition, in order to reduce the influence of the posture fluctuation of the self-balancing car 01 on the working stability of the image collection unit 03 (e.g., keeping the stability of the lens) in the movement process, in the embodiment, the posture information, namely the third parameter (e.g., pitch, yaw, roll or the like) of the self-balancing car 01 is acquired according to certain frequency, and the posture of the image collection unit 03 is further adjusted (may be fine tuned) accordingly to always keep the shooting posture of the image collection unit 03 as the optimal posture (optimal pitch, yaw, roll) without being influenced by the jitter and jolt of the self-balancing car 01, so as to improve the visual effect of the image.

Second Scenario:

No movement track is preset for the self-balancing car 01, the self-balancing car 01 can automatically track the target object based on the UWB unit (the preset tracking distance and/or the tracking angle or the like is satisfied), in a process when the self-balancing car 01 tracks the target object, the UWB unit on the tripod head 02 measures the position information between the target object (no matter the target object is static or moving) and the UWB unit, and the tripod head 02 is adjusted to make the lens of the image collection unit 03 (camera) be always aligned with the target object. The target tracking shooting process in the movement process of the self-balancing car 01 is as tracks:

firstly, based on the trigger of the user, the self-balancing car 01 acquires a first instruction, wherein the first instruction is used for indicating to carry out image collection based on target tracking; the self-balancing car 01 responds to the first instruction, and the UWB unit on the tripod head 02 communicates with the UWB tag installed on the target object to acquire the position information (a relative distance and a relative angle or the like) between the UWB tag and the UWB unit;

secondly, the self-balancing car 01 acquires a first parameter (a translation speed, a rotating speed or the like of a wheel) used for controlling the own movement state according to the position information, and controls the movement state of the self-balancing car 01 according to the acquired first parameter, so that the self-balancing car 01 tracks the target object;

moreover, the tripod head 02 acquires the second parameter used for adjusting the posture (three postures of pitch, yaw and roll) of the tripod head 02 according to the position information, and the own posture of the tripod head 02 is adjusted according to the second parameter to make the lens of the image collection unit 03 be always aligned with the target object in the movement process of the self-balancing car 01, so that the target object is always located in the composition of the image collection unit 03 (for example, the target object is always located in the central area of the composition of the image collection unit 03); and in addition, in order to reduce the influence of the posture fluctuation of the self-balancing car 01 on the working stability of the image collection unit 03 (e.g., keeping the stability of the lens) in the movement process, in the embodiment, the posture information, namely the third parameter (e.g., pitch, yaw, roll or the like) of the self-balancing car 01 is acquired according to certain frequency, and the posture of the image collection unit 03 is further adjusted (may be fine tuned) accordingly to always keep the shooting posture of the image collection unit 03 as the optimal posture (optimal pitch, yaw, roll) without being influenced by the jitter and jolt of the self-balancing car 01, so as to improve the visual effect of the image.

Third Scenario:

A restricted movement track/restricted movement area of the self-balancing car 01 is preset, the self-balancing car 01 can only move on the preset track/in the preset area (but the difference with the first scenario lies in that the self-balancing car 01 can automatically move on the preset track/in the preset); the self-balancing car 01 can track the target object based on the UWB unit under restriction conditions (i.e., the restriction of the movement track or the movement area), in a process when the self-balancing car 01 tracks the target object, the UWB unit on the tripod head 02 measures the position information between the target object (no matter the target object is static or moving) and the UWB unit, and the tripod head 02 is adjusted to make the lens of the image collection unit 03 (camera) be always aligned with the target object. The target tracking shooting process in the movement process of the self-balancing car 01 is as tracks:

firstly, based on the trigger of the user, the self-balancing car 01 acquires the first instruction, wherein the first instruction is used for indicating to carry out image collection based on target tracking; the self-balancing car 01 responds to the first instruction, and the UWB unit on the tripod head 02 communicates with the UWB tag installed on the target object to acquire the position information between the UWB tag and the UWB unit;

secondly, the self-balancing car 01 acquires the first parameter (the translation speed, the rotating speed or the like of the wheel) used for controlling the own movement state according to the position information, predicts the movement track of the self-balancing car 01 according to the first parameter after acquiring the first parameter, compares the predicted movement track with the restricted movement track or the restricted movement area to judge whether the predicted movement track exceeds the restricted movement track or the restricted movement area, and if so, corrects the first parameter, so the predicted movement track is prevented from exceeding the restricted movement track or the restricted movement area by the corrected first parameter, and if not, the first parameter does not need to be corrected;

the movement state of the self-balancing car 01 is controlled according to the corrected first parameter, so that the self-balancing car 01 can only track the target object on the restricted movement track or in the restricted movement area;

moreover, the tripod head 02 acquires the second parameter used for adjusting the posture (three postures of pitch, yaw and roll) of the tripod head 02 according to the position information, and the own posture of the tripod head 02 is adjusted according to the second parameter to make the lens of the image collection unit 03 be always aligned with the target object in the movement process of the self-balancing car 01, so that the target object is always located in the composition of the image collection unit 03 (for example, the target object is always located in the central area of the composition of the image collection unit 03); and in addition, in order to reduce the influence of the posture fluctuation of the self-balancing car 01 on the working stability of the image collection unit 03 (e.g., keeping the stability of the lens) in the movement process, in the embodiment, the posture information, namely the third parameter (e.g., pitch, yaw, roll or the like) of the self-balancing car 01 is acquired according to certain frequency, and the posture of the image collection unit 03 is further adjusted (may be fine tuned) accordingly to always keep the shooting posture of the image collection unit 03 as the optimal posture (optimal pitch, yaw, roll) without being influenced by the jitter and jolt of the self-balancing car 01, so as to improve the visual effect of the image.

In summary, by implementing the embodiment of the present invention, the electronic device can track the target object and can adaptively adjust the image collection posture of the image collection unit in a tracking process, so that the target object is always in the composition of the image collection unit; and moreover, the influence of jitter and jolt of the electronic device on the image collection posture of the image collection unit in the movement process is detected, and the image collection posture is further fine tuned, so that the image collection unit can deal with the jitter and jolt of the electronic device in the movement process, so as to guarantee the visual effect of the acquired image. The target tracking shooting in the embodiment of the present invention is not limited by shooting environments or shooting ranges, and image/video shooting with higher degrees of freedom and flexibility can be achieved, so that the application scenarios are extensive.

In addition, the solutions in the embodiment of the present invention are not merely limited to the application on the self-balancing car (two-dimensional space autonomous movement device), and they should be also applicable to the application on an unmanned aerial vehicle (three-dimensional space autonomous movement device); and the implementation process on the unmanned aerial vehicle (three-dimensional space autonomous movement device) is similar to the implementation process on the two-dimensional space autonomous movement device, thus will not be repeated redundantly herein.

In the several embodiments provided in the present invention, it should be understood that, the disclosed method, apparatus and electronic device can be implemented in other manners. For example, the device embodiments described above are merely exemplary, e.g., the division of the units is only a logic function division, other division manners can exist in practical implementation, for example, a plurality of units or components can be combined or integrated to another system, or some features can be omitted or not implemented. In addition, the displayed or discussed mutual coupling or direct coupling or communication connection between the components can be indirect coupling or communication connection of devices or units through some interfaces, and can be in electrical, mechanical or other forms.

The units described as separate components can be separated physically or not, the components displayed as units can be physical units or not, namely, can be located in one place, or can be distributed on a plurality of network units. A part of or all of the units can be selected to implement the purposes of the solutions in the embodiments according to actual demands.

In addition, the functional units in the embodiments of the present invention can be integrated in a processing unit, or each unit is singly used as a unit, or two or more units are integrated in one unit; and the integrated unit can be implemented in the form of hardware and can also be implemented in a form of hardware and software functional units.

Those of ordinary skill in the art can understand that all or a part of the steps in the above method embodiments can be implemented by a program instructing related hardware, the foregoing program can be stored in a computer readable storage medium, and when being executed, the program executes the steps including the above method embodiments; and the foregoing storage medium includes various media capable of storing program codes, such as a mobile storage device, a read-only memory (ROM), a random access memory (RAM), a magnetic disk or an optical disk, etc.

Or, if the aforementioned integrated unit in the embodiments of the present invention is implemented in the form of a software functional module and is sold or used as an independent product, it can also be stored in a computer readable storage medium. Based on this understanding, the technical solutions substantially, or the parts contributing to the prior art in the embodiments of the present invention can be implemented in the form of a software product, the computer software product is stored in a storage medium, and includes a plurality of instructions enabling a computer device (which can be a personal computer, a server, a network device or the like) to execute all or a part of the methods in the embodiments of the present invention. The foregoing storage medium includes a variety of media capable of storing program codes, such as a mobile storage device, a read-only memory (ROM), a random access memory (RAM), a magnetic disk or an optical disk, etc.

In view of this, the embodiments of the present invention further provide a computer readable storage medium, wherein the storage medium includes a group of computer executable instructions, and the instructions are used for executing the information processing method in the embodiments of the present invention.

The foregoing descriptions are merely specific implementations of the present invention, but the protection scope of the present invention is not limited thereto. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:

1. An information processing method, applied to a mobile an electronic device, wherein the electronic device is provided with an image collection unit, the image collection unit can carry out image collection, and the method comprises:

acquiring a first instruction, wherein the first instruction is used for indicating to carry out image collection based on target tracking;

responding to the first instruction, and acquiring position information between a target object and the electronic device;

acquiring a first parameter according to the position information, and controlling a movement state of the electronic device according to the first parameter, so that the electronic device tracks the target object, wherein the first parameter is a parameter used for controlling the movement state of the electronic device; and acquiring a second parameter according to the position information, and controlling an image collection posture of the image collection unit according to the second parameter, so that the image collection unit can acquire an image satisfying a first condition in a process when the electronic device tracks the target object;

wherein preset first restriction data is stored in the electronic device, and the first restriction data is used for describing a restricted movement track or a restricted movement area of the electronic device; and wherein the method further comprises: recording the restricted movement track of the electronic device in a tracking manner:

acquiring a third instruction, wherein the third instruction is used for indicating to start recording a movement track of the electronic device;

responding to the third instruction, and recording time-varying coded disc data and time-varying inertial measurement unit (MU) data in a movement process of the electronic device, wherein the time-varying coded disc data and the time-varying IMU data are used for describing the restricted movement track;

acquiring a fourth instruction, wherein the fourth instruction is used for indicating to stop recording the movement track of the electronic device; and responding to the fourth instruction, and storing the recorded time-varying coded disc data and time-varying IMU data.

2. The information processing method of claim 1, wherein based on control of the first restriction data, the electronic device cannot move to the outside of the restricted movement track or the restricted movement area; and the method further comprises:

after acquiring the first parameter according to the position information, correcting the first parameter according to the first restriction data, and controlling the movement state of the electronic device according to the corrected first parameter, so that the electronic device only tracks the target object on the restricted movement track or in the restricted movement area.

3. The information processing method of claim 1, further comprising:

acquiring a third parameter of the electronic device, and further adjusting the image collection posture of the image collection unit according to the third parameter after acquiring the image satisfying the first condition, in order to acquire an image satisfying a second condition, wherein the third parameter is used for describing the own posture of the electronic device.

4. The information processing method of claim 1, wherein an ultra wideband (UWB) tag is arranged on the target object, the electronic device comprises a UWB unit, and the acquiring the position information between the target object and the electronic device comprises:

carrying out, by the electronic device, UWB signal interaction with the UWB tag through the UWB unit, and acquiring the position information between the target object and the electronic device based on a signal sent by the UWB unit to the UWB tag and a received return signal of the UWB tag.

5. An electronic device, comprising: a moving unit, an image collection unit and a target locking unit, wherein the image collection unit and the target locking unit are arranged on the moving unit, the moving unit can move while carrying the image collection unit and the target locking unit, the target locking unit is used for locking a target object, and the image collection unit is used for carrying out image collection;

the target locking unit is further used for acquiring a first instruction, wherein the first instruction is used for indicating to carry out image collection based on target tracking; and responding to the first instruction, acquiring position information between the target object and the electronic device, and sending the position information to the moving unit and the image collection unit;

the moving unit is further used for receiving the position information sent by the target locking unit, acquiring a first parameter according to the position information, and controlling a movement state of the moving unit according to the first parameter, so that the moving unit tracks the target object, wherein the first parameter is a parameter used for controlling the movement state of the moving unit; and the image collection unit is further used for receiving the position information sent by the target locking unit, acquiring a second parameter according to the position information, and controlling an image collection posture of the image collection unit according to the second parameter, so that the image collection unit can acquire an image satisfying a first condition in a process when the moving unit tracks the target object;

wherein the electronic device further comprises:

a first restriction data storage unit, configured for storing preset first restriction data, wherein the first restriction data is used for describing a restricted movement track or a restricted movement area of the electronic device; and a restricted movement track recording unit, configured for recording the restricted movement track of the electronic device in a tracking manner:

acquiring a third instruction, wherein the third instruction is used for indicating to start recording a movement track of the electronic device; responding to the third instruction, and recording time-varying coded disc data and time-varying inertial measurement unit (IMU) data in a movement process of the electronic device, wherein the time-varying coded disc data and the time-varying IMU data are used for describing the restricted movement track; acquiring a fourth instruction, wherein the fourth instruction is used for indicating to stop recording the movement track of the electronic device; and responding to the fourth instruction, and stopping recording the time-varying coded disc data and the time-varying IMU data;

wherein the recorded time-varying coded disc data and time-varying IMU data are stored in the first restriction data storage unit or a second restriction data storage unit.

6. The electronic device of claim 5, wherein based on control of the first restriction data, the electronic device cannot move to outside of the restricted movement track or the restricted movement area; and the moving unit is further used for: after acquiring the first parameter according to the position information, correcting the first parameter according to the first restriction data, and controlling a movement state of the electronic device according to the corrected first parameter, so that the moving unit only tracks the target object on the restricted movement track or in the restricted movement area.

7. The electronic device of claim 5, wherein the image collection unit is further used for acquiring a third parameter of the electronic device, and further adjusting the image collection posture of the image collection unit according to the third parameter after acquiring the image satisfying the first condition, in order to acquire an image satisfying a second condition, wherein the third parameter is used for describing the own posture of the moving unit.

8. The electronic device of claim 5, wherein the target locking unit is an ultra wideband (UWB) unit, the UWB unit is used for carrying out UWB signal interaction with a UWB tag arranged on the target object, and acquiring the position information between the target object and the electronic device based on a signal sent by the UWB unit to the UWB tag and a received return signal of the UWB tag.

9. A non-transitory computer storage medium, wherein a computer executable instruction is stored in the non-transitory computer storage medium, and the computer executable instruction is configured to execute the information processing method of claim 1.

10. An information processing method, applied to an electronic device, wherein the electronic device is provided with an image collection unit, the image collection unit can carry out image collection, and the method comprises:

acquiring a first instruction, wherein the first instruction is used for indicating to carry out image collection based on target tracking;

responding to the first instruction, and acquiring position information between a target object and the electronic device;

acquiring a first parameter according to the position information, and controlling a movement state of the electronic device according to the first parameter, so that the electronic device tracks the target object, wherein the first parameter is a parameter used for controlling the movement state of the electronic device; and acquiring a second parameter according to the position information, and controlling an image collection posture of the image collection unit according to the second parameter, so that the image collection unit can acquire an image satisfying a first condition in a process when the electronic device tracks the target object;

wherein preset second restriction data is stored in the electronic device, the second restriction data is used for describing a restricted movement track of the electronic device and a movement strategy of the electronic device on the restricted movement track; and wherein the method further comprises: recording the restricted movement track of the electronic device in a tracking manner:

acquiring a third instruction, wherein the third instruction is used for indicating to start recording a movement track of the electronic device;

responding to the third instruction, and recording time-varying coded disc data and time-varying inertial measurement unit (IMU) data in a movement process of the electronic device, wherein the time-varying coded disc data and the time-varying IMU data are used for describing the restricted movement track;

acquiring a fourth instruction, wherein the fourth instruction is used for indicating to stop recording the movement track of the electronic device; and responding to the fourth instruction, and storing the recorded time-varying coded disc data and time-varying IMU data.

11. The information processing method of claim 10, further comprising:

acquiring a second instruction, wherein the second instruction is used for indicating the electronic device to move along the restricted movement track in accordance with the movement strategy and carry out image collection on the target object in the movement process; and responding to the second instruction, controlling the electronic device to move on the restricted movement track in accordance with the movement strategy according to the second restriction data, and in the movement process of the electronic device, acquiring the position information between the target object and the electronic device, acquiring the second parameter according to the position information, and controlling the image collection posture of the image collection unit according to the second parameter, so that the image collection unit can acquire the image satisfying the first condition in the movement process of the electronic device.

12. The information processing method of claim 10, further comprising:

acquiring a third parameter of the electronic device, and further adjusting the image collection posture of the image collection unit according to the third parameter after acquiring the image satisfying the first condition, in order to acquire an image satisfying a second condition, wherein the third parameter is used for describing the own posture of the electronic device.

13. The information processing method of claim 10, wherein an ultra wideband (UWB) tag is arranged on the target object, the electronic device comprises a UWB unit, and the acquiring the position information between the target object and the electronic device comprises:

carrying out, by the electronic device, UWB signal interaction with the UWB tag through the UWB unit, and acquiring the position information between the target object and the electronic device based on a signal sent by the UWB unit to the UWB tag and a received return signal of the UWB tag.

14. An electronic device, comprising: a moving unit, an image collection unit and a target locking unit, wherein the image collection unit and the target locking unit are arranged on the moving unit, the moving unit can move while carrying the image collection unit and the target locking unit, the target locking unit is used for locking a target object, and the image collection unit and is used for carrying out image collection;

the target locking unit is further used for acquiring a first instruction, wherein the first instruction is used for indicating to carry out image collection based on target tracking; and responding to the first instruction, acquiring position information between the target object and the electronic device, and sending the position information to the moving unit and the image collection unit;

the moving unit is further used for receiving the position information sent by the target locking unit, acquiring a first parameter according to the position information, and controlling a movement state of the moving unit according to the first parameter, so that the moving unit tracks the target object, wherein the first parameter is a parameter used for controlling the movement state of the moving unit; and the image collection unit is further used for receiving the position information sent by the target locking unit, acquiring a second parameter according to the position information, and controlling an image collection posture of the image collection unit according to the second parameter, so that the image collection unit can acquire an image satisfying a first condition in a process when the moving unit tracks the target object;

wherein the electronic device further comprises:

a second restriction data storage unit, used for storing preset second restriction data, wherein the second restriction data is used for describing a restricted movement track of the electronic device and a movement strategy of the electronic device on the restricted movement track; and a restricted movement track recording unit, configured for recording the restricted movement track of the electronic device in a tracking manner:

acquiring a third instruction, wherein the third instruction is used for indicating to start recording a movement track of the electronic device; responding to the third instruction, and recording time-varying coded disc data and time-varying inertial measurement unit (IMU) data in a movement process of the electronic device, wherein the time-varying coded disc data and the time-varying IMU data are used for describing the restricted movement track; acquiring a fourth instruction, wherein the fourth instruction is used for indicating to stop recording the movement track of the electronic device; and responding to the fourth instruction, and stopping recording the time-varying coded disc data and the time-varying IMU data;

wherein the recorded time-varying coded disc data and time-varying IMU data are stored in a first restriction data storage unit or the second restriction data storage unit.

15. The electronic device of claim 14, wherein the moving unit, the target locking unit and the image collection unit are further used for acquiring a second instruction, wherein the second instruction is used for indicating the electronic device to move along the restricted movement track in accordance with the movement strategy and carry out image collection on the target object in the movement process;

the moving unit is further used for responding to the second instruction, and controlling the moving unit to move on the restricted movement track in accordance with the movement strategy according to the second restriction data;

the target locking unit is further used for: in the movement process of the electronic device, acquiring the position information between the target object and the electronic device, and sending the position information to the image collection unit; and the image collection unit is further used for acquiring the second parameter according to the position information, and controlling the image collection posture of the image collection unit according to the second parameter, so that the image collection unit can acquire the image satisfying the first condition in the movement process of the electronic device.

16. The electronic device of claim 14, wherein the image collection unit is further used for acquiring a third parameter of the electronic device, and further adjusting the image collection posture of the image collection unit according to the third parameter after acquiring the image satisfying the first condition, in order to acquire an image satisfying a second condition, wherein the third parameter is used for describing the own posture of the moving unit.

17. The electronic device of claim 14, wherein the target locking unit is an ultra wideband (UWB) unit, the UWB unit is used for carrying out UWB signal interaction with a UWB tag arranged on the target object, and acquiring the position information between the target object and the electronic device based on a signal sent by the UWB unit to the UWB tag and a received return signal of the UWB tag.

* * * * *